(12) United States Patent
Preudhomme (10) Patent No.: US 8,459,287 B1
(45) Date of Patent: Jun. 11, 2013

(54) WATER SERVICE TO SUPPLY CONVERSION USING TRIM TUBE SLEEVED JOINING COMPONENT

(76) Inventor: Aaron Preudhomme, White Plains, NY (US)

( * ) Notice: Subject to any disclaimer, the term of this patent is extended or adjusted under 35 U.S.C. 154(b) by 0 days.

(21) Appl. No.: 13/290,057

(22) Filed: Nov. 5, 2011

Related U.S. Application Data (62) Division of application No. 12/290,484, filed on Oct. 30, 2008, now abandoned.

(51) Int. Cl.
*F16L 55/00* (2006.01)
(52) U.S. Cl.
USPC .................. 137/15.08; 29/525.01; 29/890.144
(58) Field of Classification Search
USPC ...... 137/15.08; 285/45, 46, 115, 116; 29/521, 29/525.01, 890.141, 890.144
See application file for complete search history.

(56) References Cited

U.S. PATENT DOCUMENTS

| | | | | |
|---|---|---|---|---|
| 4,094,536 A | * | 6/1978 | Cole et al. | 285/21.1 |
| 5,275,199 A | * | 1/1994 | Howell | 137/360 |
| 6,109,660 A | * | 8/2000 | Akiyama et al. | 285/45 |
| 7,549,680 B2 | * | 6/2009 | Gibbs | 285/354 |

* cited by examiner

*Primary Examiner* — Eric Keasel
*Assistant Examiner* — Reinaldo Sanchez-Medina
(74) *Attorney, Agent, or Firm* — Elting Patents and Technology LLC; Mark J. Elting (57) ABSTRACT

Trim tube sleeved joining component for use in enclosing a service pipe and establishing sealable fluid communication therewith a supply line. A joining component such as a compression fitting allows sealable junction of the service pipe with the supply line when fitted thereon, and a trim tube is mechanically affixed to the joining component and formed to allow placement radially outside of the service pipe as a sleeve. A high speed fitting of a trim tube results without need for soldering the trim tube to the service pipe.

7 Claims, 12 Drawing Sheets

*Fig. 4*
INVENTION

*Fig. 5*

PRIOR ART

PRIOR ART

Standard Supply Connection to Service Pipe

Cut plumbed service pipe to size

Prepare service pipe for sweat or joining operation
(e.g., use abrasive and apply flux)

Prepare trim tube for sweat or joining operation

Butt or sleeve joint (e.g., sweat / solder) service pipe to trim tube

Repair any thermal damage to wall

Thread trim tube to supply or joining component
(e.g., compression fitting or valve)

Cap off supply or close downstream valve

Pressure test

Re-sweat / solder or re-establish fitting seal as necessary

Clean off any solder joint

*Fig. 11*

INVENTION

Standard Supply Connection to Service Pipe

Cut plumbed service pipe to size

Slide TRIM TUBE SLEEVED JOINING COMPONENT
over service pipe

Slide any needed ferrule or seal over service pipe

Join TRIM TUBE SLEEVED JOINING COMPONENT to
supply joining component
(e.g., tighten threaded compression fitting)

WATER SERVICE TO SUPPLY CONVERSION USING TRIM TUBE SLEEVED JOINING COMPONENT

TECHNICAL FIELD

This invention relates to establishing supply connections from utility service pipes, tubes, and similar plumbing for water distribution, and general utility service. More specifically, it relates to providing a finished, decorative, and/or protective sleeve or structure to shroud incoming service and supply lines using a minimum of process steps and components.

BACKGROUND OF THE INVENTION

The emphasis in this disclosure is illustratively drawn to water and similar utility service, but the invention can apply to distribution or delivery, via piping or tubing, of any fluid or gas, or material substances behaving similarly (such as powders)—including fuel gases, such as natural gas and propane, as well as other gases such as dry nitrogen or air, helium and oxygen; hydraulic oils and similar motive fluids used for mechanical leverage, action-at-a-distance, or as a signaling medium; coolants, such as ethylene glycol, refrigerants, or oil; and material delivery of slurries, powders, soaps, and electrolytic solutions.

In the plumbing arts, especially for water distribution, trim tubes are often used to convert rough service piping to more finished piping that is joined to a supply connection, such as a valve body or a flexible supply hose, often using various methods in the joining arts, such as commonly used solder, flared, or compression-type fittings.

A trim tube (or cover, decorative cover, sleeve, extension or sheath, as often named in the art) is often plated with a metal such as gold, silver, chrome, nickel, brass, zinc, or an alloy such as bronze, using electrolytic or other known deposition techniques. Trim tubes are also often finished to a high or other desired luster, such as to a satin finish.

An added function for trim tubes is that they can provide increased protection for service pipes. For example, incoming copper service pipes in residential service are often unsightly and can need protection from physical abuse. A common residential application is cited in FIGS. 1 and 2 below. In some industrial applications, a trim tube can offer protection from dust, such as wheat or grain dust, saw dust, or abrasive dusts, or general protection by preventing physical contact with the service pipe.

Two general types of trim tube arrangements are found in the prior art, as cited below in FIG. 6. In the first, the trim tube becomes part of the plumbing system, and must be joined to incoming service pipe. In the second, the trim tube acts solely as a covering, with the service pipe connected directly to a supply component such as a valve body or supply hose.

Figure 9:
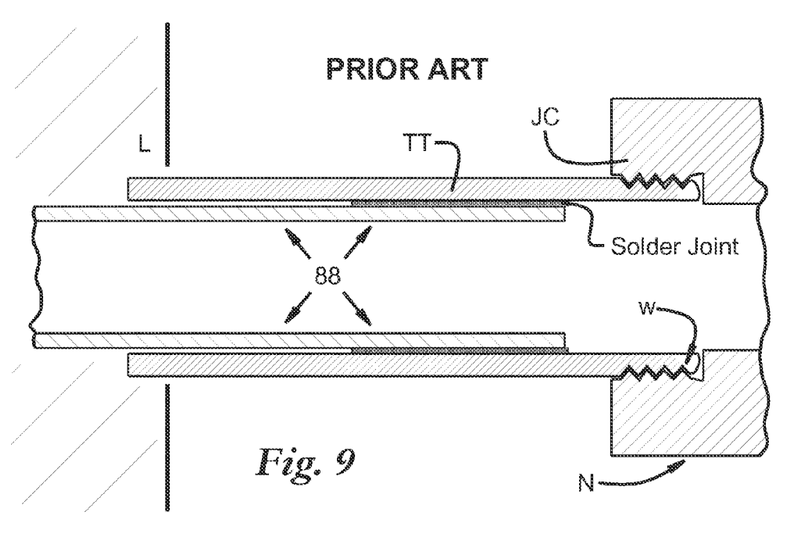
FIG. 9 shows a cross-sectional view of a service pipe, trim tube, and a joining component, for an illustrative prior art service to supply connection scheme.

In a typical residential or light commercial application, the first type of trim tube is often employed, and is customarily joined or soldered to an incoming service pipe, as cited in FIG. 9 and elsewhere. A solder joint is typically used, where the joint is almost always made on a visible part of the service pipe. It is difficult and time consuming even for a skilled plumber or installer to sweat solder a plated trim tube to the service pipe it covers without heat from the solder joining process causing blackening, discoloring, blemishing, tarnishing, or scratching of the plating on the trim tube, as well as causing possible thermal damage or discoloring to any adjacent wall or floor. In addition, if cross-linked polyethylene (PEX) tubing, or polyvinyl chloride (PVC) tubing are used, an adapter is needed to convert to metal pipe or tube service. It is often necessary to break plaster, wall board, or flooring to hide the adapter inside a wall or below a floor. This requires wall and/or floor repair after plumbing is complete. PEX and PVC pipe or tube is also sensitive to heat, and can often be damaged by soldering the plated trim tube too close to the adapter fitting that is attached to the PEX or PVC pipe.

Furthermore, if the trim tube is joined to the service pipe, it must meet engineering standards for plumbing, such as promulgated by the American Society for Testing and Materials (ASTM). This drives up weight and cost for the trim tube.

The second type of trim tube used in the prior art uses slip-on decorative tubes which are typically not as securely affixed, can loosen over time, and can allow oxidation and moisture entry between the trim tube and the service pipe. They often can require certain mating components, as well as additional assembly steps.

Both types of trim tubes require additional assembly and/or joining steps, as discussed below, which increase job costs and make disassembly more difficult.

These problems are not addressed by the prior art. For example, U.S. Pat. Nos. 999,332 to P. Mueller and 1,502,154 to P. Mueller et al., do not provide trim tubes, but rather use a polished or finished supply line. The arrangement taught requires that the supply line be a smaller diameter than the unfinished service pipe that typically comes from a wall, wall space, or floor. The polished/nickled supply pipe thus installed is subjected to water service and is pressurized, and must meet plumbing standards.

U.S. Pat. No. 6,161,568 to Dragotta employs a trim tube (pipe protector 26) which is soldered to service pipe at one end and threaded for joining to valving. This arrangement requires that the trim tube be sealingly joined to the service pipe using a solder joint, with the attendant problems cited above.

Similarly, U.S. Pat. No. 3,105,707 to Jacobson also uses solder or sweat joint, and the trim tube, chrome-plated tube 27, must be supported by contact with an adapter fitting 12 and an escutcheon plate 28. This arrangement for securing chrome-plated tube 27 can allow oxidation, as the tube is slid onto the adapter fitting 12 and not secured permanently, and cooperation of the chrome-plate tube 27 must be achieved when sliding over the supporting surface 19 of the adapter fitting 12. Furthermore, the chrome-plated tube must be used in conjunction with a precisely sized adapter fitting 12.

SUMMARY OF THE INVENTION

Accordingly, it is an object of the invention to provide an independent trim tube for a service to supply connection, and afford a high-speed and high quality installation that can shield the service pipe from oxidation and ingress of moisture. The preferred embodiment of the invention allows for a fast hook-up to a water service line without need for a soldered joint. This also allows the ease of dis-assembly and can, for one preferred embodiment, provide low cost afforded by use of a conventional compression fitting or flare fitting.

The independent trim tube as provided by the invention is securely affixed to a supply installation, and is not merely a loose decorative sleeve or covering, which can move when urged manually or by thermally cycling, such due to as day/night temperature differences. The opportunity of internal corrosion inside the trim tube is thus minimized.

The independent trim tube is not pressurized, and does not convey liquid, gas or fluid, as do many trim tubes that must be made to withstand plumbing service. This can save on material costs and can allow use of alloys and materials not normally used for plumbing service, or low thickness trim tube material. For example, if expensive material like stainless steel is desired for trim tube construction, it can be made in low thickness to save cost. With no need to meet standards for engineering like shear resistance and resistance to galling, the trim tube can be engineered for appearance, protection, and lower costs.

To the extent that the independent trim tube is radially outside the service pipe, as described below, galvanic and metallurgical interaction of the trim tube and service pipe is minimized.

The invention provides for ease of installation, with no soldering joints needed, with attendant problems like discoloring of the trim tube. The invention saves time and material and yields a protective and decorative trim tube, and a watertight and mechanically rigid supply connection. Benefits include lower inventory requirements and no open interface trim tube to service pipe where corrosion could commence.

The invention comprises an independent trim tube sleeved joining component for use in enclosing a service pipe and establishing sealable fluid communication therewith a supply line. The independent trim tube sleeved joining component can comprise {a] a joining component sized, formed and positioned to allow sealable junction of the service pipe with the supply line when fitted thereon; and [b] an independent trim tube not in fluid communication with the service pipe and mechanically affixed to the joining component and formed, sized, and positioned on the joining component to allow placement radially outside of the service pipe as a sleeve after the joining component is so fitted and to be mechanically independent of the service pipe, and of sufficiently length as shown in the accompanying drawings to extend substantially away from the joining component to which it is mechanically affixed.

The joining component can comprise a compression fitting, or any number of other known fittings.

The independent trim tube can be mechanically affixed to the joining component via a joint selected from any of a welded joint, a swaged joint, a pressed joint, a brazed joint, a soldered joint, and an interference joint. That joint can be formed to provide a hermetic seal between the trim tube and the joining component.

The independent trim tube and joining component can be so formed that the trim tube becomes mechanically affixed to the joining component upon the sealable junction of the service pipe with the supply line.

The invention can also comprise a method for connecting a supply line to a service pipe, where the method comprises:
[1] Placing a trim tube sleeved joining component that itself comprises an independent trim tube deriving all of its mechanical support from being mechanically affixed to the joining component over the service pipe such that the trim tube at least partially shrouds the service pipe for a sufficient length that extends substantially away from the joining component to which it is mechanically affixed; and such that the independent trim tube is not in fluid communication and mechanical communication with the service pipe;
[2] further positioning the trim tube sleeved joining component to allow sealable junction of the service pipe with the supply line when fitted thereon; and
[3] so fitting the supply line to the service pipe using the trim tube sleeved joining component.

This method can also be preceded by the step of
[0] placing the trim tube into the joining component to form the trim tube sleeved joining component to be used in step [1], where, for example, the trim tube is packaged as a separate component for assembly at a job site.

Optionally, this step [0] can additionally comprise forming a hermetic seal between the trim tube and the joining component.

Step [3] can optionally comprise mechanically affixing the trim tube to the joining component during that fitting.

The method can also be preceded by joining a trim tube into a joining component to form the trim tube sleeved joining component to be used in step [1], wherein the joining comprises any of welding, swaging, pressing, brazing, soldering, and establishing an interference joint, with or without the establishment of a hermetic seal between the trim tube and the joining component.

Other objects will become apparent from reading the specification and the appended claims.

DEFINITIONS

The following definitions shall be used throughout, including the appended claims:

Compression fitting—is shown illustratively, and shall be considered but one illustrative type of joining component. For clarity and brevity, not all types of joining components or connection systems are shown here, but they are contemplated by the invention.

Independent trim tube—shall denote any trim tube which derives substantially all of its mechanical support from being mechanically affixed to a joining component, and not from any other body, part or structure, including a service pipe, any nearby wall, or any bracket, escutcheon, grommet, set screw, clip, gasket or other material body. A trim tube which is incidentally supported by the service pipe that it surrounds shall still be considered an independent trim tube. It is contemplated by the invention that the trim tube is not loose, but rather is mechanically affixed to, and derives its mechanical support from, the joining component.

Interference joint—as given in the appended clams shall include the use of one of more set screws as known in the mechanical arts.

Join/joined/joining—shall denote hermetically and mechanically joining by various methods, such as by welding, soldering, or brazing; by cold forming processes such as swaging; or by mechanical contact or pressure, such as found in a flare fitting or compression joint or fitting, as shown illustratively herein as a preferred embodiment of the invention.

Joining component—shall denote any sealable or relatively sealable component that serves to connect or helps connect two conduits or pipes, regardless of their cross-sectional forms (e.g., round pipe, rectangular pipe, oval pipe, etc.). In a preferred embodiment of the invention, standard compression fittings can be used, and can include a seal or ferrule between two mating surfaces drawn together by threaded mating members, but all types of such fittings are contempated by the invention, including types not explicitly shown here, such as flare fittings and various quick-connect fittings that do not rely on threaded connections, but instead are indexed or snap into place. A joining component can comprise a nut or flats for tightening, and other structures for desired service, like sheaths or guards, without departing from the scope of the invention.

Mechanically affixed—shall denote any joining operation known in the mechanical arts which allows a trim tube to be securely affixed to (but not necessarily in a sealable manner) to a joining component. It shall include the use of trim tubes that are integral with (e.g., welded or brazed to) the joining component, as well as trim tubes which might become mechanically affixed to the joining component during assembly or during the fitting of the joining component to the service pipe. Mechanically affixed shall not imply necessary mechanical support from any other body, part or structure, including the service pipe itself, any wall adjacent the service pipe or supply pipe, or any bracket, escutcheon, grommet, set screw, clip, or gasket. It is contemplated by some preferred embodiments of the invention to make the trim tube operably functioning as an independent entity, save for its being mechanically affixed to the joining component.

Pipe—shall be synonymous with tube, regardless of differences between pipe and tube known in the plumbing arts.

Figures 7, 8:
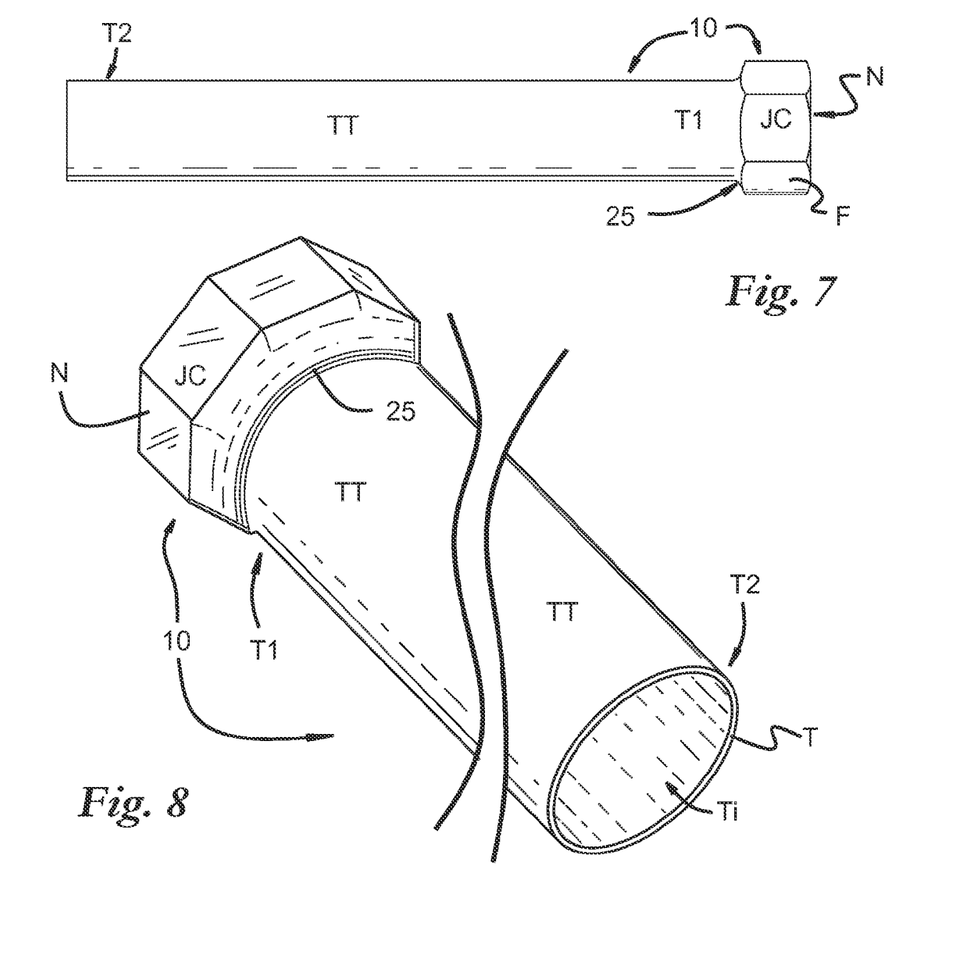
FIG. 7 shows a part cross-sectional, part surface view of a trim tube sleeved joining component according to the invention.
FIG. 8 shows the trim tube sleeved joining component of FIG. 7, in an oblique surface view.

Service pipe—commonly provides pressurized water or other fluid or gas service, and is often referred to by lay persons as a water supply pipe. In this disclosure, however, supply pipe (see definition below) shall be distinct from service pipe. Service pipe shall denote any pipe or conduit to be shrouded by a trim tube according to the invention, regardless of whether or not a service pipe so defined would otherwise be named a supply pipe or line. That means, for example, that any pipe enclosed by the trim tube sleeved joining component as shown in FIGS. 7-8 herein shall be termed a service pipe. The preferred embodiment illustrated herein uses a trim tube sleeved joining component to shroud and protect a service pipe for incoming water or other fluid or gas service, but it is contemplated here that a similar trim tube sleeved joining component could be used to shroud a supply line downstream from a service pipe. Correspondingly, a supply line downstream from a service pipe as defined here can also be a service pipe (for ongoing service downstream, for example) if it is also enclosed or shrouded by the trim tube sleeved joining component as shown in FIGS. 7-8 and elsewhere. Both service pipes and supply pipes can have non-round cross-sections, such as pipes with rectangular cross-sections, oval cross-sections, or complex cross-sections, such as twin joined cross-sections which appear cross-sectionally to resemble a numeral eight on paper.

Also, any fitting performing this function as defined, such as an elbow, adapter, or valve body, shall be considered a service pipe.

Sleeve—shall include full-coverage sleeves and also any partial sleeve or structure which does not completely surround the service pipe such as a trim tube sleeved joining component which does not completely enclose the accessible portion of the service pipe. Such a partial covering sleeve, may, for example, cover perhaps only 180 degrees of the circumference of the service pipe, to allow only for improved appearance and/or shielding from rain or dust, but still allow an underside of the service pipe to be exposed to air. This arrangement can find use in cooling lines where a complete sheath might be undesirable because of the effect it might have on thermal transfer or because unduly high temperatures for the trim tube are undesirable.

Supply/supply line—shall denote any pipe or conduit sealingly joined to a joining component according to the invention, regardless of whether or not a supply line so defined would otherwise be named a service pipe or line. This definition is a corresponding definition to service pipe (see above). Any fitting performing this function, such as an elbow, adapter, or valve body, shall be considered a supply line.

Trim tube—shall include any and all material sleeves or covers which can shroud or partially shroud a service pipe as contemplated by the invention. Known by trade as a trim tube, cover, decorative cover, sleeve, extension or sheath, it can take many forms not shown here, such as trim tubes with non-round cross-sections (e.g., rectangular) and covers which comprise individual elements, e.g., needle-like structures which visually shroud a service pipe, but do not complete enclose it.

DETAILED DESCRIPTION

Figure 1:
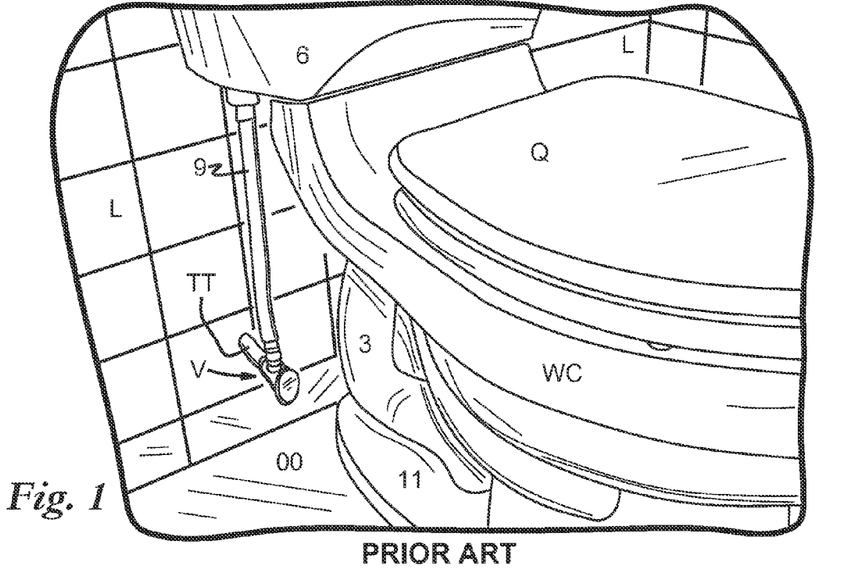
FIG. 1 shows a perspective surface view of a prior art water closet or toilet illustrating a trim tube shrouded service pipe, a valve and a supply line.

Referring to FIG. 1, a perspective surface view of an illustrative water closet or toilet of known construction is shown. Toilet WC is shown, comprising a water tank 6 in selective fluid communication with a bowl (not explicitly shown) underneath seat cover Q and resting on a base 11 that is affixed to a floor 00. The bowl communicates with a waste line (not shown) underneath base 11 via a trapway 3. As illustratively shown, incoming water service to tank 6 is provided by a trim tube TT shown emerging from a wall L. Trim tube TT is shown joined to valve V, which is joined to and selectively feeds tank supply hose 9.

Figure 2:
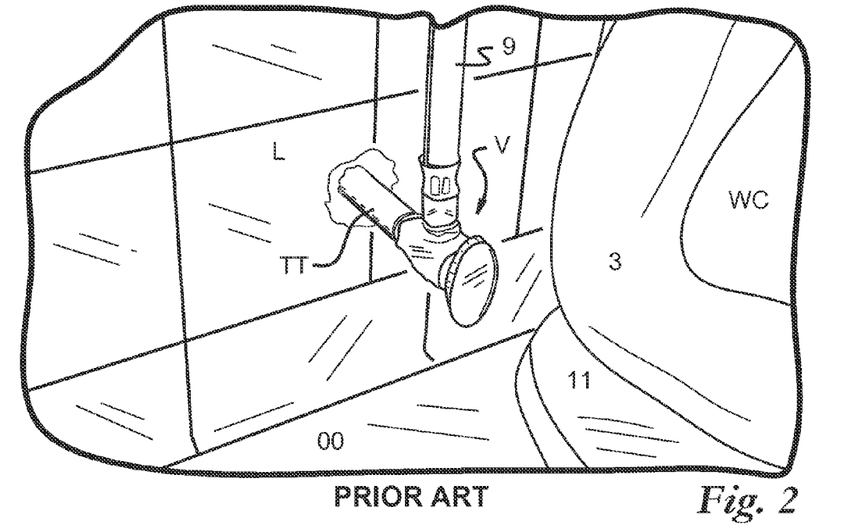
FIG. 2 shows a close-up view of a portion of the view shown in FIG. 1.

FIG. 2 shows a close-up view of the trim tube TT and joined connections shown in FIG. 1. For clarity, a wall-covering escutcheon is not shown, and as shown, a break has been made in wall L to accommodate trim tube TT. In this arrangement shown, trim tube TT is water carrying, under pressure, and joined using a solder joint or equivalent technique to a water service pipe, not shown. During such a joining operation, wall L often sustains staining or damage, including thermal damage, as a result of conventional operations to form a supply connection.

Even though a wall and toilet fixture are shown, the invention can find application anywhere a supply connection is made to a service pipe, using any number of connection methods known in the joining arts, according to definitions given below.

Figure 3:
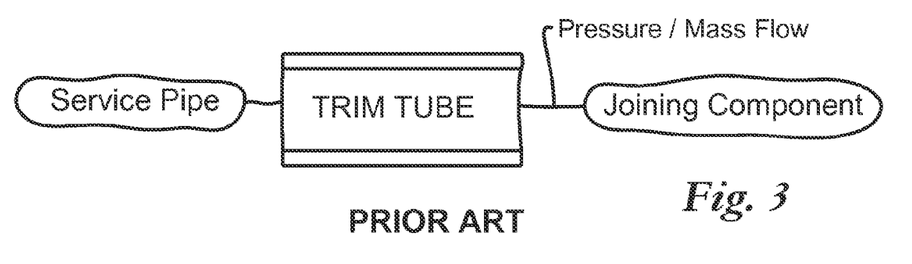
FIG. 3 shows a schematic diagram representing illustratively the arrangement and roles of a service pipe, a trim tube, and a joining component, as utilized in the prior art.

The type of service-to-supply connection typified by FIGS. 1 and 2 is shown schematically in FIG. 3, and in cross section in FIG. 9 as described below. FIG. 3 shows a schematic diagram that represents the essential or basic arrangement and roles of a service pipe, a trim tube, and a joining component, as utilized in the prior art. In this abstract representation, a service pipe (shown, Service Pipe) is in sealingly fluid communication with a trim tube (shown, TRIM TUBE), as shown by a line representing a sealable junction between the two elements that allows a Pressure/Mass Flow as indicated. The trim tube TT is typically pressurized, and in turn forms a sealable junction, such as a threaded connection, with a Joining Component as shown. Because the trim tube TT is part of the fluid circuit established, it must meet plumbing standards, such as ASTM standards B302 and B88, for copper pipe. Furthermore, process steps must be undertaken to join the trim tube TT to the components listed.

Figure 4:
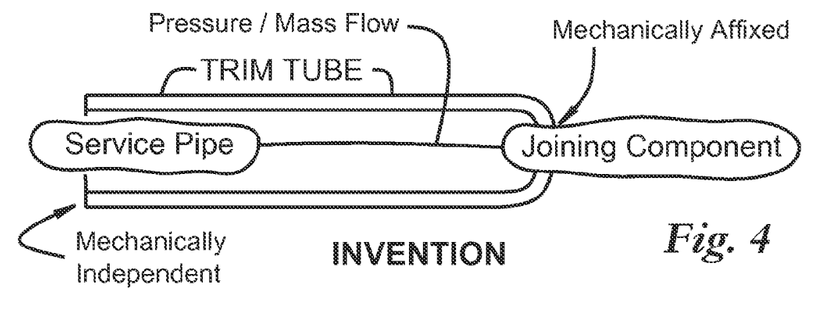
FIG. 4 shows a schematic diagram similar to that if FIG. 3, and representing the arrangement and roles of a service pipe, a trim tube, and a joining component, as taught by the instant invention.

Using the instant invention, however, as reference to the following description will show to one skilled in the art, allows for an arrangement shown in FIG. 4, which shows a similar representative schematic diagram showing the arrangement and roles of a service pipe, a trim tube, and a joining component according to the invention. As shown, the Service Pipe is in direction fluid communication with the Joining Component via a mutual sealable junction, so that Pressure/Mass Flow as indicated by the line shown is confined to those two components. The TRIM TUBE is mechanically affixed to the Joining Component as indicated and forms a combined component herein referred to as a trim tube sleeved joining component as cited below. The trim tube surrounds at least partially the Service Pipe as shown, and is mechanically independent of same. With the trim tube not joined to the service pipe, a non-pressurized tube not having to meet ASTM or other specifications can be used, and many process steps can be omitted, saving on installation labor costs.

Installing such a trim tube sleeved joining component is faster than prior art methods in part because the trim tube is mechanically independent save for being mechanically affixed to the joining component. There is no need for the trim tube to be attached to any escutcheon or any other fitting or component, including the service pipe.

Figure 5:
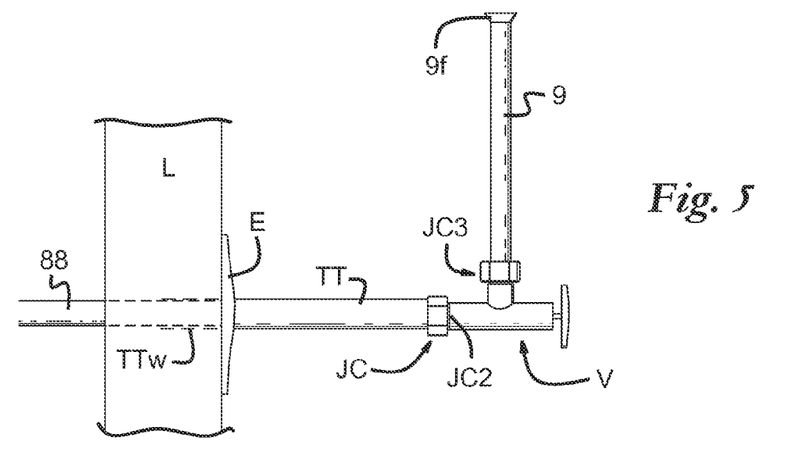
FIG. 5 shows a partial cross-sectional, partial surface view of a service and supply connection emerging from a wall, using an arrangement afforded by the instant invention.

From the exterior, the appearance of the finished installation is almost identical, FIG. 5 shows a partial cross-sectional, partial surface view of a service and supply connection emerging from a wall, using the invention to provide a supply connection similar to that shown in FIGS. 1 and 2. As shown, a service pipe 88 passes through wall L and is urged into a sealable junction using joining component JC with a supply component, shown here as second joining component JC2, which also functions as a valve body for valve V. The actual sealable junction of service pipe 88 to joining component JC2 is not shown, but rather is hidden by trim tube TT, which is mechanically affixed to joining component JC. Trim tube TT is sized or cut to extend into wall L, with a portion TTw of trim tube TT shown in silhouette inside wall L. A known escutcheon E as shown can hide or better seal any gap between trim tube TT and the wall.

Any number of additional components can be used to extend the supply connection established at second joining component JC2, and as illustratively shown, valve V is formed to engage sealably using third joining component JC3 to supply hose or pipe 9, which can be flared, using known techniques to similarly engage with another component such as a toilet or sink supply using flare 9f.

Joining component JC2 can be another joining component or compression fitting, or a threaded pipe, or any other known fitting or body. Trim tube TT can extend further into wall L than shown, or can extend as a protector in applications where a long sheath is desired, such inside a factory room having a corrosive atmosphere or a high concentration of dust. The length of trim tube TT and other pipes shown is merely illustrative, and is changed or shortened for clarity of presentation.

Figure 6:
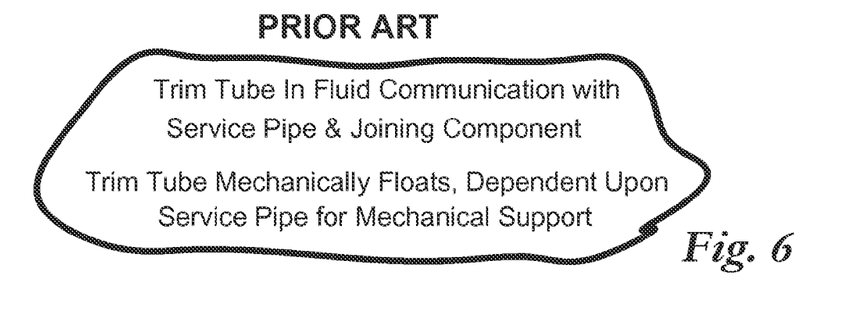
FIG. 6 shows two illustrative listings of trim tube operational characteristics for service to supply connections as made in the prior art.

FIG. 6 shows two illustrative listings of trim tube operational characteristics for service to supply connections as used in the prior art. One arrangement already shown above is that of a Trim Tube in Fluid Communication with Service Pipe & Joining Component. The other is where the Trim Tube Mechanically Floats, Dependent Upon Service Pipe for Mechanical Support, as shown.

Now referring to FIG. 7, a part cross-sectional, part surface view of a trim tube sleeved joining component according to the invention is shown. In this preferred embodiment, a joining component JC, such as a known female compression fitting, and comprising a nut N with flats F, is mechanically affixed to a trim tube TT using a joint 25 using known joining techniques. One can solder, braze, weld, forge, swage or otherwise join the trim tube TT to the compression fitting or joining component JC. Fabrication can vary from cast one piece construction, to welded or joined pieces, to pressed pieces to mechanically affixing the trim tube TT using fasteners such as set screws or stab lock devices. Joint 25 can optionally provide a hermetic seal between trim tube TT and joining component JC. Trim tube TT has a forward end T1 and a back end T2 as shown, and the trim tube TT and joining component JC so joined form a trim tube sleeved joining component 10.

The trim tube sleeved joining component 10 is shown in a close-up oblique surface view in FIG. 8. As shown by the twin cutout curves, the length of trim tube TT can vary, and the joint 25 can be finely finished for aesthetic appearance and to resist corrosion. Trim tube thicknesses using the instant invention can vary, and because the interior Ti is not subject to plumbing service, there is much freedom to select the material T from which the trim tube is made. As mentioned in the definitions above, trim tube TT does not have to completely round service pipe 88 or provide 360 degree circumferential coverage like the trim tube sleeved joining component 10 as shown. For example, in cooling line applications where hot coolant is transported, it can be desirable not to shroud completely service pipe 88, to allow movement of air immediately adjacent any service pipe 88 inside trim tube TT.

Referring now to FIG. 9 a cross-sectional view is shown, corresponding to FIG. 3, of a service pipe, trim tube, and a joining component, for an illustrative prior art service to supply connection. Service pipe 88 is shown emerging from wall L and is joined to trim tube TT using a conventional Solder Joint as shown. The solder joint can be a sleeve joint as shown, or a known butt joint, not shown. Trim tube TT as shown circumferentially surrounds service pipe 88 and also emerges from wall L. Since trim tube TT conveys water under pressure from service pipe 88 to joining component JC, it must meet plumbing standards, for supporting encountered temperatures and pressures, and to provide for needed metallurgical suitability for service encountered. This is in addition to requirements relating to its function as a trim tube. Trim tube TT essentially replaces service pipe 88 as a conveyor, and is shown with threads w which facilitate mechanical and sealable junction with a similarly threaded joining component JC as shown.

Figure 10:
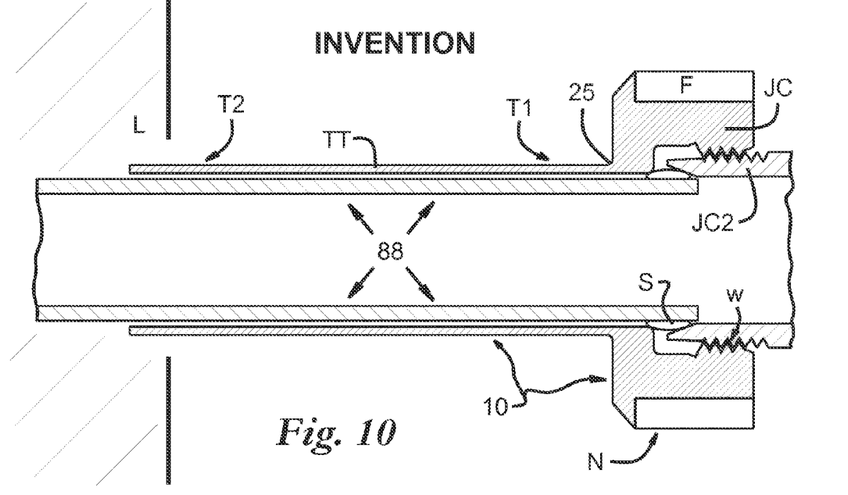
FIG. 10 shows a cross-sectional view of one preferred embodiment of a service pipe, and a trim tube sleeved joining component as used to establish sealable fluid communication with a supply line as taught by the instant invention.

Referring now to FIG. 10, a similar cross-sectional view is given, now showing a preferred embodiment of the invention. Service pipe 88 emerges from wall L and joining component JC, shown here as a conventional compression fitting, is sized, formed, and positioned to allow sealable junction of service pipe 88 with a supply line represented by second joining component JC2 using threads was shown. Optionally, joining component JC and second joining component JC2 can be formed to bear down cooperatively in a known manner upon seal S as shown to provide a tight seal when fitted together. Forward end T1 of trim tube TT is mechanically affixed to joining component JC at joint 25, as shown. Optionally, joining component JC and trim tube TT can be cast or molded as one piece. Trim tube TT is further formed, sized and positioned to allow placement radially outside service pipe 88. In a preferred embodiment, trim tube TT circumferentially surrounds service pipe 88.

For both FIGS. 9 and 10, the actual coupling interaction, such as the particular geometric deformation induced in the joining components, can vary. For example, the prior art scheme illustrated in FIG. 9 uses a simple threaded connection, such as a NPT (National Pipe Thread) ½" thread, male-to-female joint. The embodiment of the invention shown in FIG. 10 uses a conventional compression fitting. But one skilled in the art, upon making reference to the invention as shown, will appreciate that the invention applies to all manner of joining components, including so-called quick connect fittings not requiring tightening with a wrench.

An escutcheon E is not shown for clarity. Trim tube TT as positioned slows or stops potential ingress of corrosion or moisture take-up between itself and service pipe 88.

An important benefit of the invention is the greatly reduced installation time and expense relative to methods of the prior art.

Figure 11:
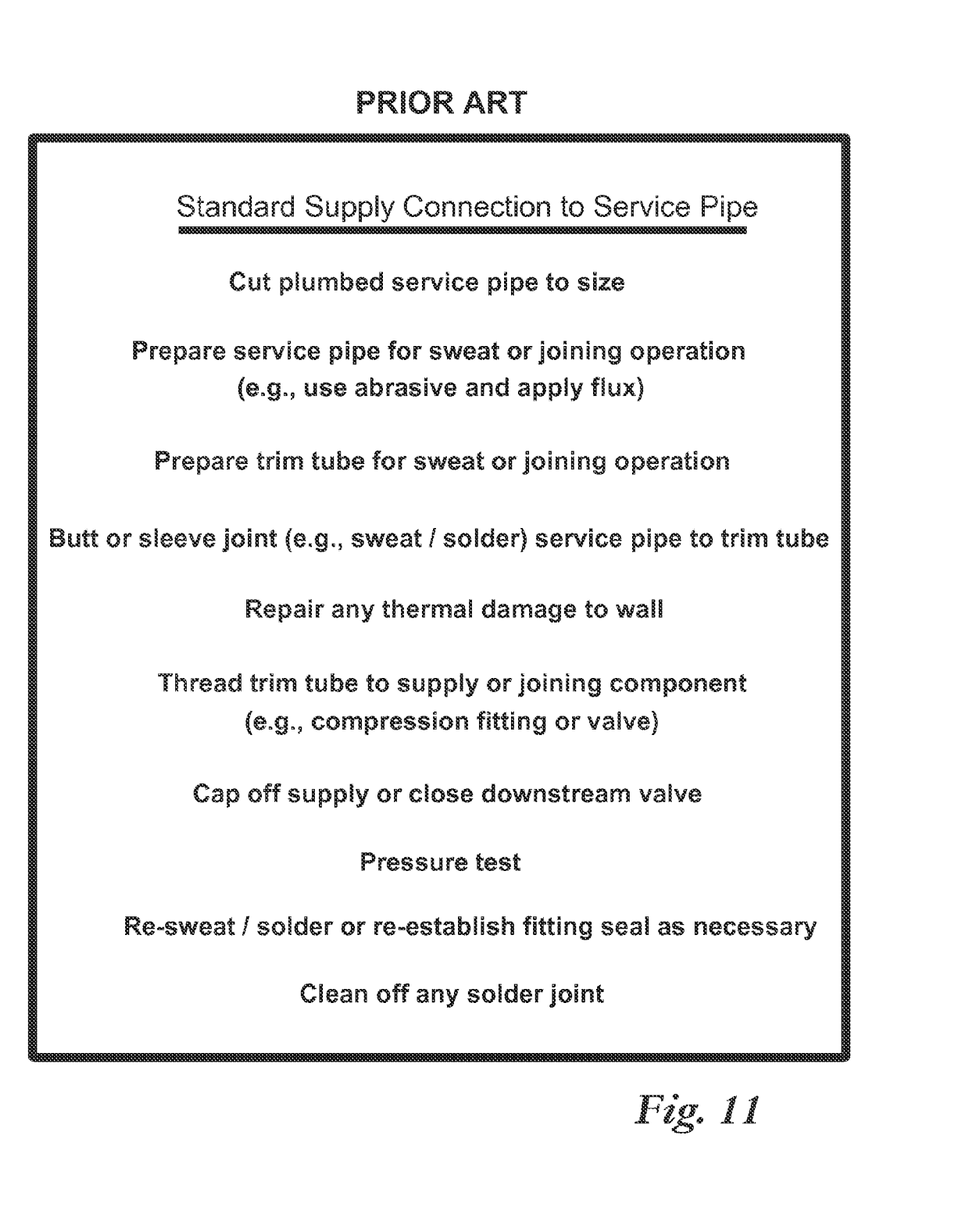
FIG. 11 shows a boxed listing of process steps to establish the supply connection to a service pipe using the structure shown in FIG. 9, according to typical steps in the prior art.

To illustrate, FIG. 11 shows a boxed listing of process steps to establish the supply connection to a service pipe using the structure shown in FIG. 9, according to typical steps in the prior art.

As shown, typical well known prior art steps to establish a standard supply connection to service pipe include:
[1] Cut plumbed service pipe to size
[2] Prepare service pipe for sweat or joining operation (e.g., use abrasive and apply flux)
[3] Prepare trim tube for sweat or joining operation
[4] Butt or sleeve joint (e.g., sweat/solder) service pipe to trim tube
[5] Repair any thermal damage to wall
[6] Thread trim tube to supply or joining component (e.g., compression fitting or valve)

Figure 12:
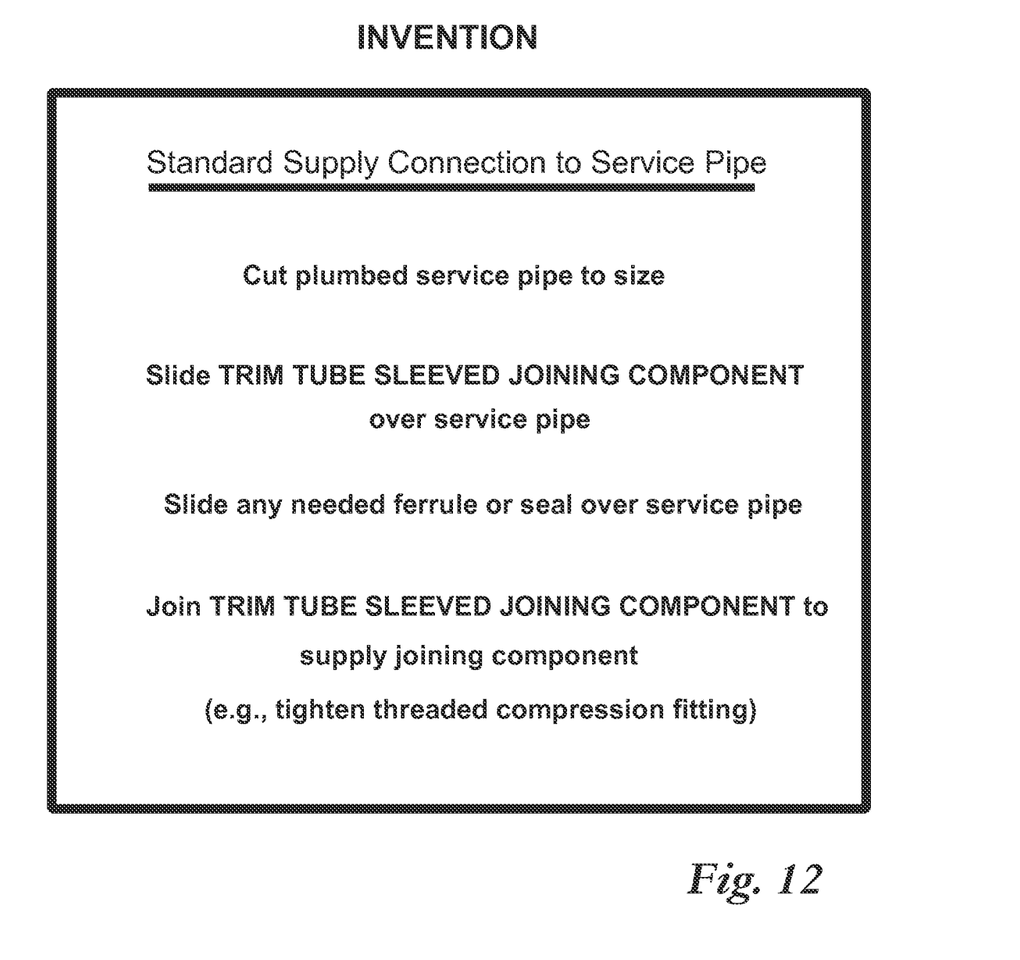
FIG. 12 shows a boxed listing of process steps to establish the supply connection to a service pipe according to the invention, using the structure illustratively shown in FIG. 10.

After a soldering or other heated joining operation, there is a relative heightened probability of a leak, and accordingly, additional steps typically include
[7] Cap off supply or close downstream valve
[8] Pressure test If there is a leak found for a water service application, all affected plumbing must be drained and dry before proceeding.
[9] Re-sweat/solder or re-establish fitting seal as necessary
[10] Clean off any solder joint In contrast, FIG. 12 shows a boxed listing of process steps to establish the supply connection to a service pipe according to the invention, using the structure illustratively shown in FIG. 10. Typical steps include:
[1] Cut plumbed service pipe to size, as before;
[2] Slide TRIM TUBE SLEEVED JOINING COMPONENT over service pipe
[3] Slide any needed ferrule or seal over service pipe
[4] Join TRIM TUBE SLEEVED JOINING COMPONENT to supply joining component (e.g., tighten threaded compression fitting).

To illustrate these steps, FIGS. 13-17 show five sequenced oblique surface views of a service pipe being prepared for a supply connection according one embodiment of the instant invention, and using the process steps shown in FIG. 12.

Figures 13, 14:
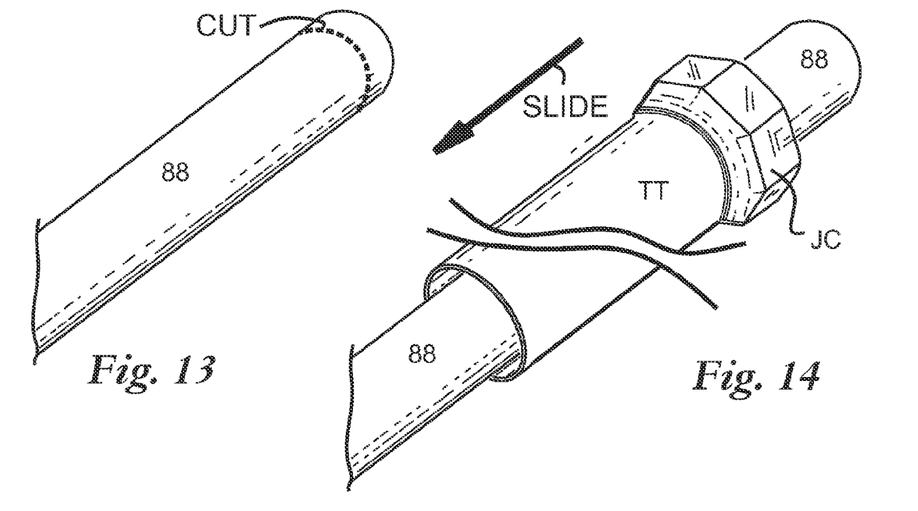
FIGS. 13-17 show five sequenced oblique surface views of a service pipe being prepared for a supply connection according to one embodiment of the instant invention, and using the process steps shown in FIG. 12.
Figure 15:
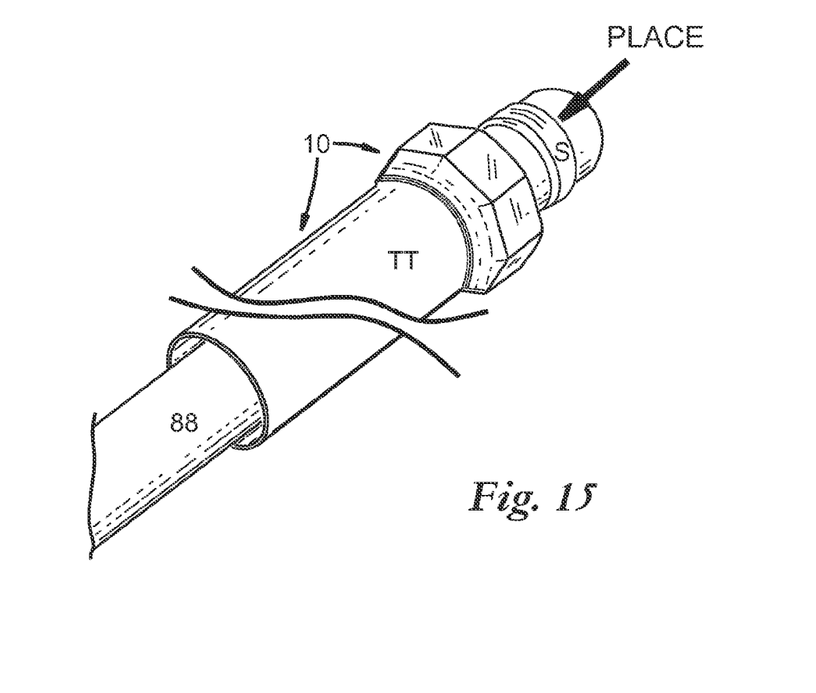
Figures 16, 17:
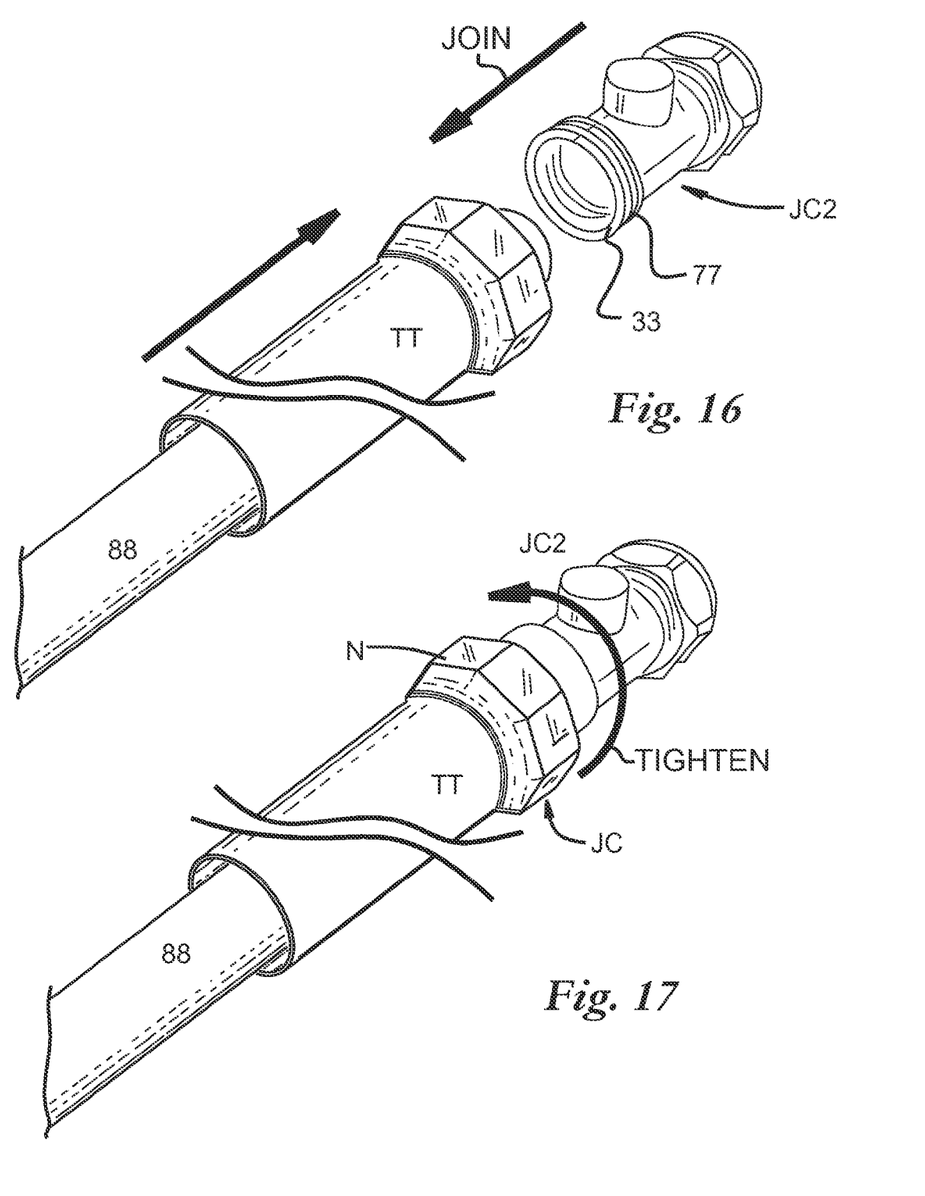

FIG. 13 shows an optional step [1] of cutting service pipe 88 to size (CUT). FIG. 14 shows step [2], how one can slide or position trim tube sleeved joining component 10 onto service pipe 88 (SLIDE). FIG. 15 shows step [3], how one can optionally place a seal, ferrule, or compression body, such as seal or ferrule S as shown, over the service pipe. The effect of having trim tube TT mechanically affixed to the joining component JC is beneficial, as it can reduce any angular deviation which works against axial alignment of the joining component JC which might make the step [4] more difficult. Second joining component JC2 is effectively a supply line, and any pipe, conduit, or fitting capable of sealably making a union with the trim tube sleeved joining component 10 and associated joining component JC can be considered a supply line. The joining component JC shown can be a known compression fitting which cooperatively can form a sealable junction with a bearing surface 33 on second joining component JC2 as shown, when both are fitted together, aided by threads 77 as shown. Final step [4] is shown in FIG. 17, where second joining component JC2 is tightened or fitted to joining component JC.

Figure 18:
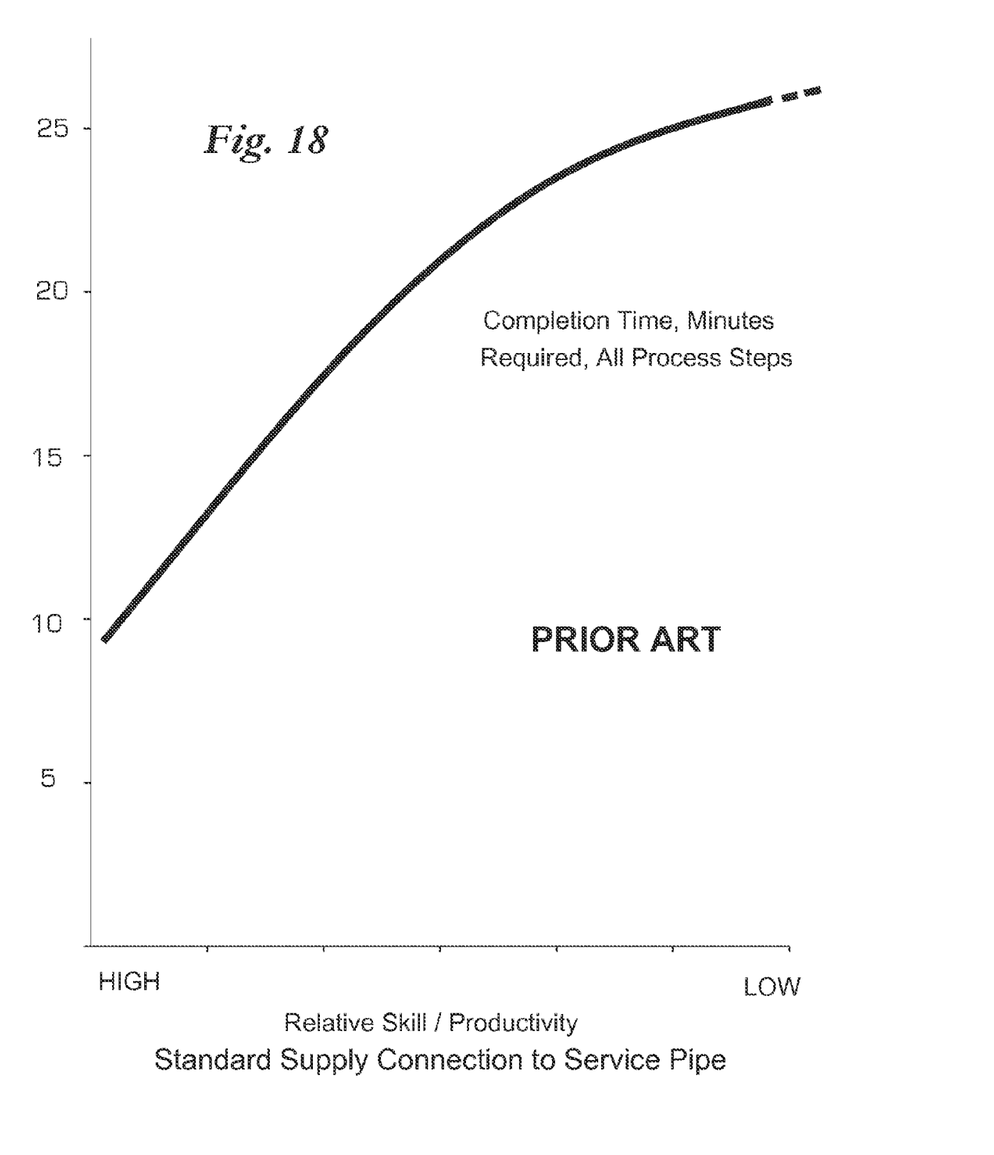
FIG. 18 shows an illustrative cartesian plot of the required completion time, in minutes, for effect the illustrative steps listed in FIG. 11, as a function of relative skill/productivity, to establish a standard supply connection to service pipe, for an illustrative prior art connection scheme.

FIG. 18 shows an illustrative cartesian plot of the required completion time, in minutes, for effect the illustrative steps listed in FIG. 11, as a function of relative skill/productivity, in establishing a standard supply connection to service pipe, for the same illustrative prior art connection scheme. As shown in the plot, completion time ranges from 9 to 25 minutes, depending skill level and relative productivity for this relative plot. Though not enumerated, many of the process steps listed in FIG. 11 involve ancillary steps, such as securing and positioning tools, like wrenches; securing and disposing a rag and/or a flux brush; and lighting or triggering a torch.

Figure 19:
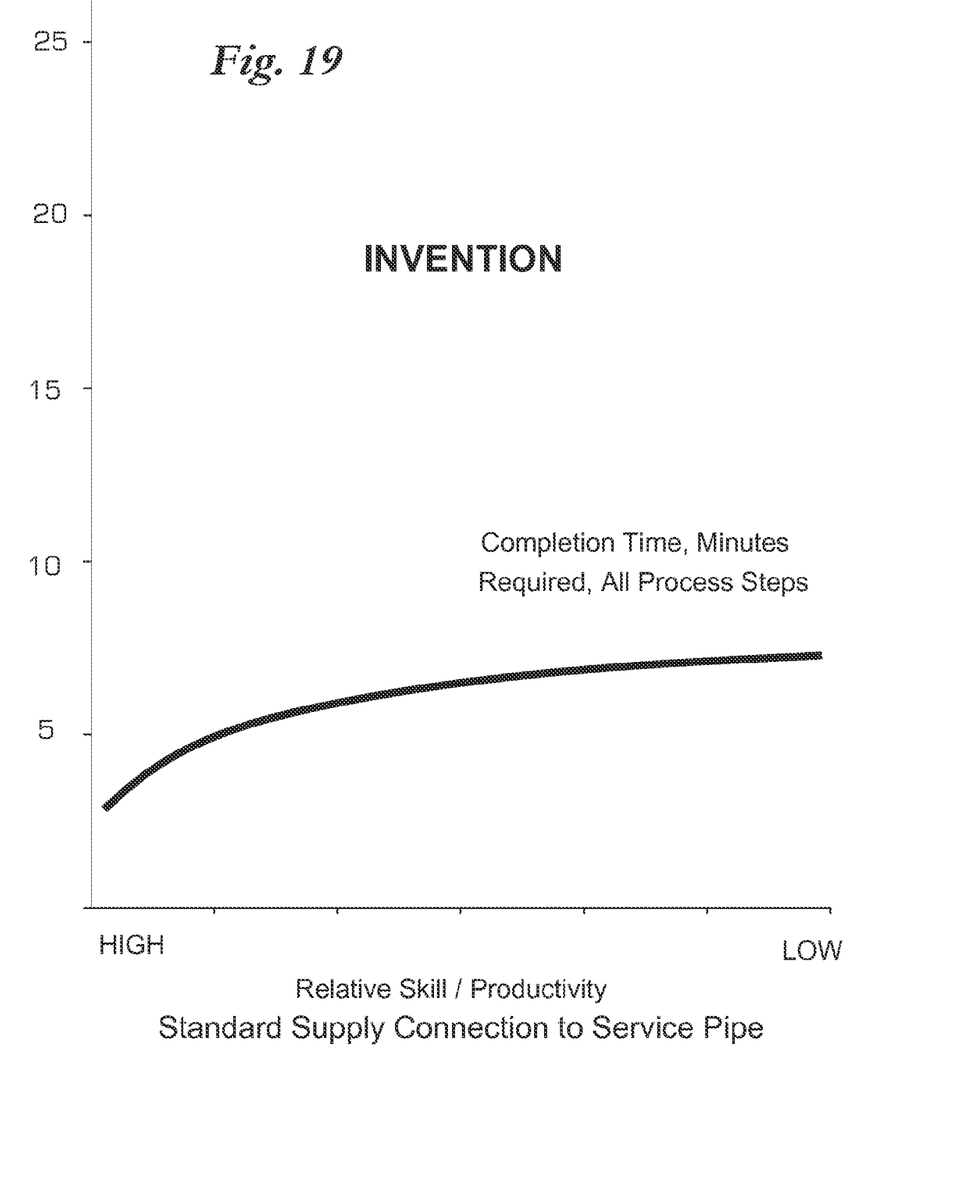
FIG. 19 shows an illustrative cartesian plot similar to and corresponding with that of FIG. 18, for the instant invention, using a trim tube sleeved joining component.

In contrast, FIG. 19 shows an illustrative cartesian plot similar to and corresponding with that of FIG. 18, for the instant invention, using a trim tube sleeved joining component. As shown, completion time ranges from a mere 2½ minutes to about 7 minutes, again depending on skill level and productivity.

Figure 20:
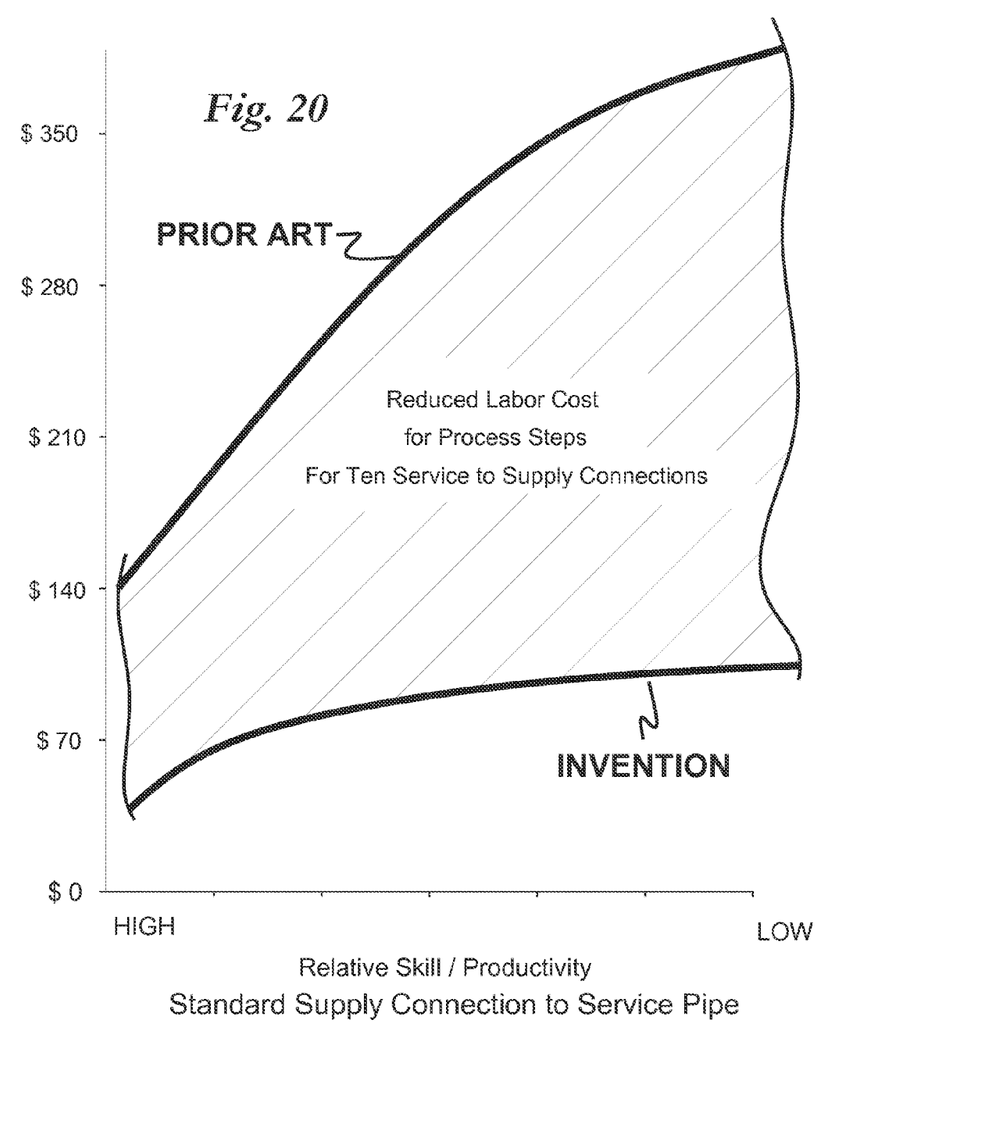
FIG. 20 shows an illustrative cartesian plot using information correspondingly combined from FIGS. 18 and 19, transformed into labor costs for ten service to supply connections, showing a labor cost savings using the instant invention.

Cost savings for multiple installations can be substantial. FIG. 20 shows a similar illustrative cartesian plot using information correspondingly combined from FIGS. 18 and 19, transformed into labor costs for ten service to supply connections, showing a labor cost savings using the instant invention. As can be seen from comparing the prior art cost plot versus the cost plot using the invention, cost savings can range from $ 100 to $300 using present day labor rates.

Another embodiment of the invention allows that the trim tube TT can be inserted into the joining component JC to form the trim tube sleeved joining component 10, during or just prior to installation.

Figure 21:
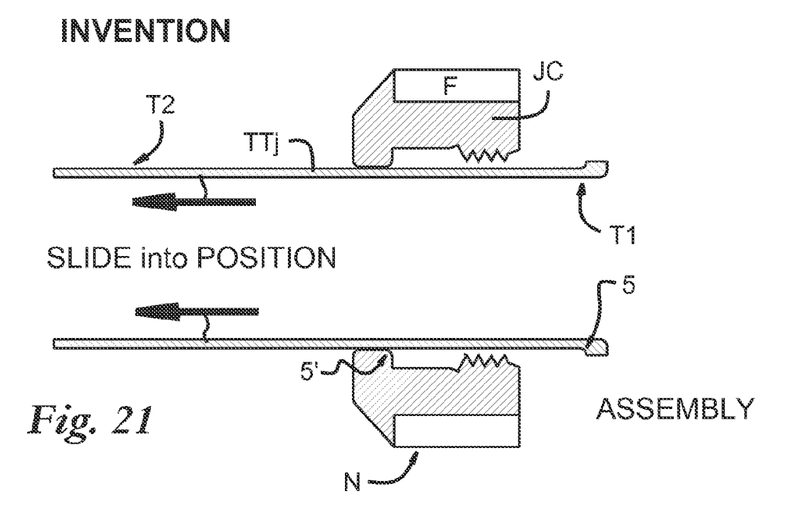
FIG. 21 shows another embodiment of the invention whereby a trim tube sleeved joining component is assembled from a separate trim tube and joining component that mechanically cooperate.
Figure 22:
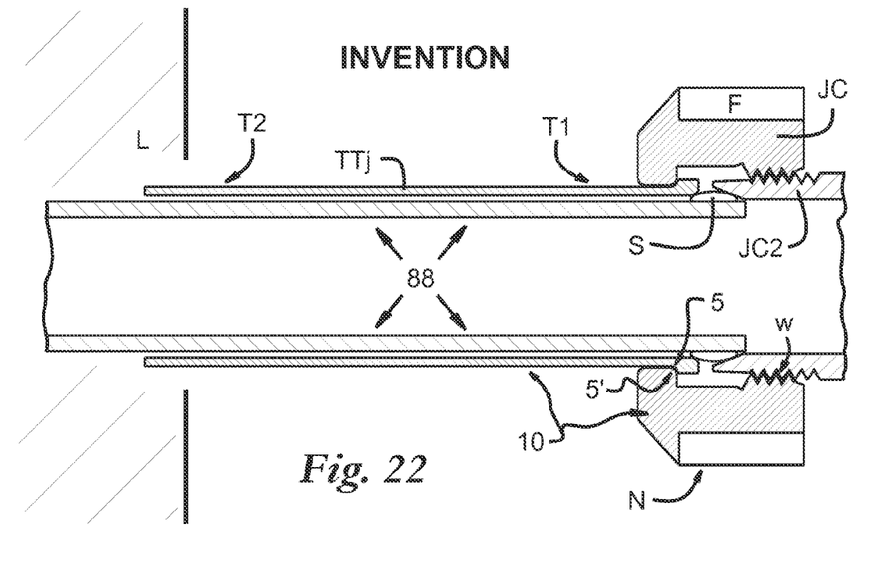
FIG. 22 shows a cross-sectional view of another preferred embodiment where a service pipe, and a trim tube sleeved joining component as used to establish sealable fluid communication with a supply line as taught by the instant invention, and using the assembled trim tube and joining component shown in FIG. 21.

Referring now to FIG. 21, a cross-sectional drawing is shown illustrating one way how a trim tube sleeved joining component can be assembled from a separate trim tube and joining component that mechanically cooperate. As shown, trim tube extension TTj possesses a forward end T1 and a back end T2. Back end T2 has been inserted as shown through joining component JC. With trim tube extension TTj is slid in the direction shown, a flange or land 5 on the outer forward end of the trim tube extension TTj gets closer to and ultimately contacts corresponding flange or land 5' on the inner rear end of joining component JC as shown. This final state is shown in FIG. 22, where a full cross-sectional view of another preferred embodiment is shown using the assembled trim tube extension TTj and joining component X. This added embodiment shows service pipe 88 making a sealable junction with second joining component JC2 using a seal S as before. The flange or land 5 of trim tube extension TTj is shown bearing tightly upon flange or land 5' of joining component X. As depicted, the inner extreme forward end of trim tube extension TTj can be considered to be part of joining component JC, and accordingly it bears upon seal S to cooperatively establish the required seal along with second joining component JC2 with the aid of threads was before. However, other such split arrangements can be used as one skilled in the art can devise.

There is obviously much freedom to exercise the elements or steps of the invention.

The description is given here to enable those of ordinary skill in the art to practice the invention. Many configurations are possible using the instant teachings, and the configurations and arrangements given here are only illustrative.

Those with ordinary skill in the art will, based on these teachings, be able to modify the invention as shown.

The invention as disclosed using the above examples may be practiced using only some of the features mentioned or illustrated above. Also, nothing as taught and claimed here shall preclude addition of other structures or functional elements. For example, trim tube TT can comprise add-on fittings or active components such as temperature sensors, or sonic transducers for leak detection, without departing from the scope of the invention.

Prior art shown, as well as embodiments of the invention shown, are illustrative only and are not intended to represent all variations of possibilities in the plumbing art, and one skilled in the art will be able, upon reading of this specification, to practice the invention in various ways to advantage.

Obviously, many modifications and variations of the present invention are possible in light of the above teaching. It is therefore to be understood that, within the scope of the appended claims, the invention may be practiced otherwise than as specifically described or suggested here.

I claim:

1. A method for connecting a supply line (9) to a service pipe (88), said method comprising:
   [1] Placing a trim tube sleeved joining component (10) that itself comprises an independent trim tube (TT) deriving all of its mechanical support from being mechanically affixed to the joining component (JC), over said service pipe such that the trim tube at least partially shrouds the service pipe for a sufficient length that extends substantially away from the joining component to which it is mechanically affixed; and such that said independent trim tube is not in fluid communication and mechanical communication with said service pipe;
   [2] further positioning said trim tube sleeved joining component to allow sealable junction of said service pipe with said supply line when fitted thereon;
   [3] so fitting said supply line to said service pipe using said trim tube sleeved joining component.

2. The method of claim 1, wherein step [1] is preceded by:
   [0] placing the independent trim tube (TT) into the joining component (JC) to form the trim tube sleeved joining component (10) to be used in step [1].

3. The method of claim, 2 wherein step [0] additionally comprises forming a hermetic seal between said independent trim tube and said joining component.

4. The method of claim 2, wherein step [3] additionally comprises mechanically affixing said independent trim tube to said joining component during said fitting.

5. The method of claim 4, wherein step [0] additionally comprises forming a hermetic seal between said independent trim tube and said joining component.

6. The method of claim 1, wherein step [1] is preceded by:
   [0] placing the independent trim tube (TT) into the joining component (JC) to form the trim tube sleeved joining component (10) to be used in step [1]; then
      joining the independent trim tube (TT) into the joining component to form the trim tube sleeved joining component (10) to be used in step [1], wherein said joining comprises any of welding, swaging, pressing, brazing, soldering, and establishing an interference joint.

7. The method of claim 6, wherein step [0] additionally comprises forming a hermetic seal between said independent trim tube and said joining component.

* * * * *